March 30, 1965   W. K. BARRETT   3,176,168
RUGGEDIZED MOUNT FOR LOW FREQUENCY CRYSTALS
Filed June 18, 1963   2 Sheets-Sheet 1
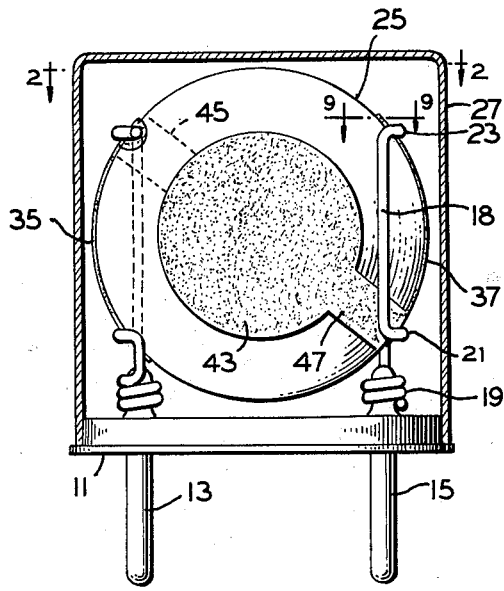
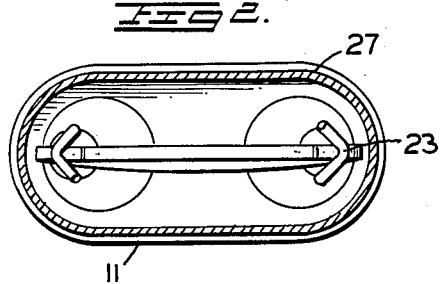
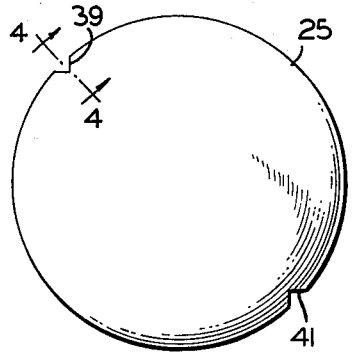
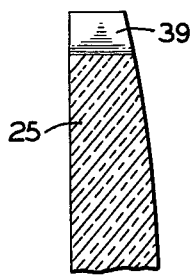
INVENTOR
WILLIAM K. BARRETT

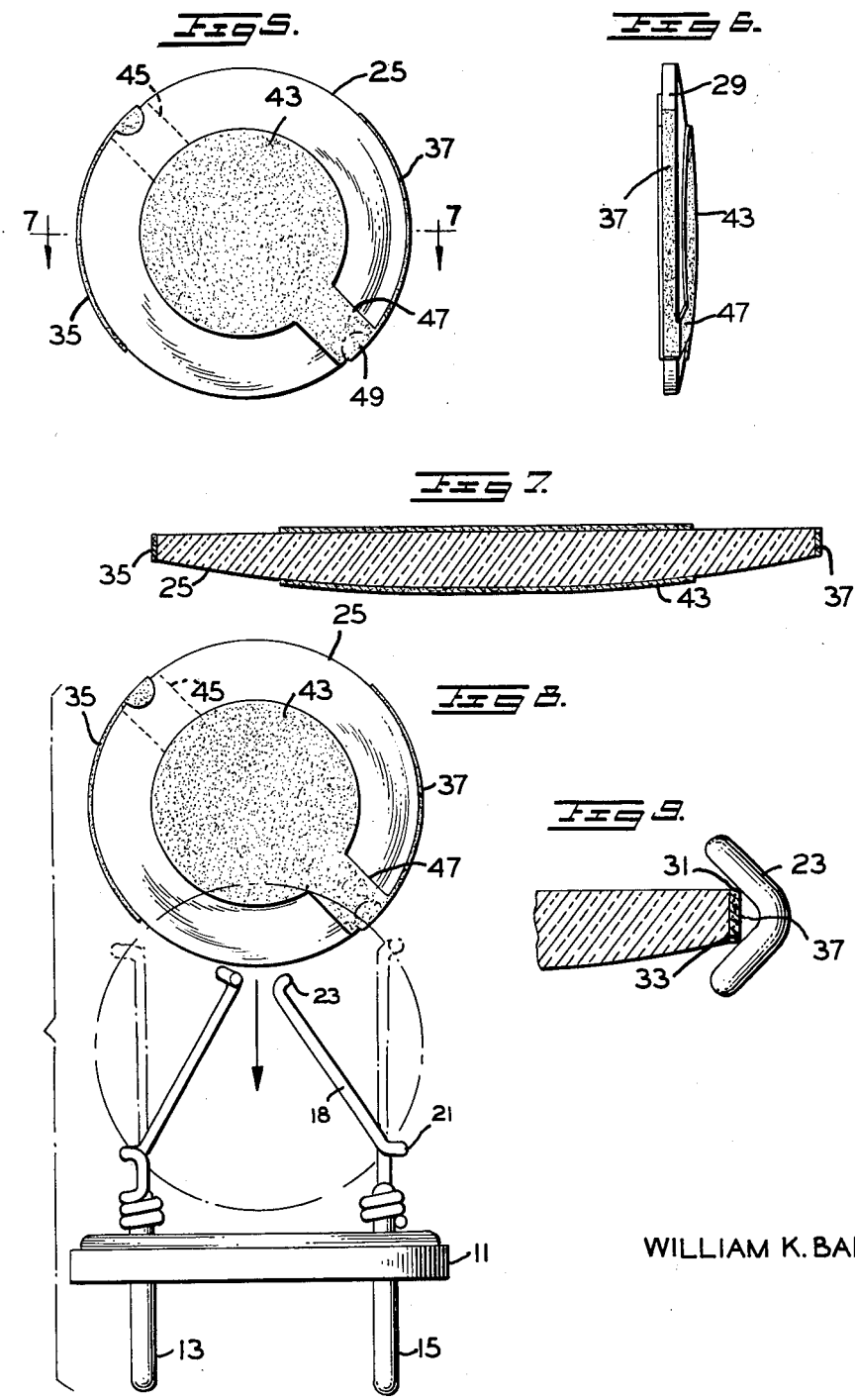

United States Patent Office 3,176,168
Patented Mar. 30, 1965

1

3,176,168
RUGGEDIZED MOUNT FOR LOW FREQUENCY
CRYSTALS
William K. Barrett, Carlisle, Pa., assignor to Dynamics
Corporation of America, New York, N.Y., a corporation of New York
Filed June 18, 1963, Ser. No. 288,703
7 Claims. (Cl. 310—9.4)

This invention relates to a crystal mount and more specifically to a ruggedized crystal mount for low frequency crystal units.

Crystal mounts in use today are designed in various sizes and types with many different styles of mounting for providing electrical connections to the crystals. Of primary importance in recent developments is the provision of a crystal structure having the smallest possible size while obtaining a high Q in the unit with a maximum aging stability. Additionally, maximum rigidity of the mount must be maintained so that it will be very rugged. In mounts presently available, one of the above factors has been of primary importance in the design with the resultant reduction of the maximum desirable characteristics of the remaining factors. Accordingly, it would be highly desirable to have a crystal mount which is small in size, simple in construction and at the same time produce a very high Q with a good aging stability and a maximum of ruggedization.

It is an object of this invention to provide a ruggedized low frequency crystal mount.

A further object of this invention is to provide a crystal mount using resilient support members which also serve as the electrical connections to the metal coatings on the crystal without the need for soldering the crystal to the support members.

Yet another object of this invention is to provide a peripheral mount for a crystal wherein the physical location of the points of contact between the mount and the periphery of the crystal are not critical.

A further object of this invention is to provide a crystal having electrodes on opposite faces thereof and conductive coatings extending from said electrodes along the peripheral edge of the crystal to provide electrical connections between the electrodes and the crystal mounts.

These and other objects will become apparent from the following description when taken in conjunction with the drawings wherein:

FIG. 1 is a sectional elevational view of the mount showing the crystal and support structure of the present invention within a hermetically sealed enclosure;

FIG. 2 is a plan view of the crystal mount of FIG. 1 taken along the lines 2—2 of FIG. 1;

FIG. 3 is an elevation view of the crystal before the electrodes are added;

FIG. 4 is a partial sectional view taken along the lines 4—4 of FIG. 3;

FIG. 5 is an elevation view of the finished crystal;

FIG. 6 is a side elevational view of the crystal of FIG. 5;

FIG. 7 is a sectional view taken along the lines 7—7 of FIG. 5;

FIG. 8 is an exploded view of the base connecting posts and supporting arms and associated crystal; and

2

FIG. 9 is a true section taken along the lines 9—9 of FIG. 1.

Turning now more specifically to the drawings, FIG. 1 illustrates a standard base 11 having electrical conductors 13 and 15 passing therethrough, with the housing 27 providing the sealed enclosure together with the base 11. Within the enclosure are a pair of identical spring supporting arms having a coil 19 at the lower end thereof which fits snugly about the upper end of the conductor 15. As these arms extend upwardly, they are constructed so as to form a bend 21 in the arm which forms substantially a right angle. The arm extends upwardly from bend 21 with a substantially straight section 18 to the extremity of the arm wherein it ends in a further bend 23, also forming substantially a right angle, for purposes which will be described in detail in connection with the other drawings.

In the specific illustration of the drawings, there is shown an AT cut crystal 25 having a central electrode 43 on each of the faces. Plated connections 45 and 47 extend from the electrodes on either face to the periphery of the crystal.

As can be seen from the plan view of FIG. 2, the conductors 13 and 15 extend upwardly through a dielectric material 17 in the base in order to prevent any possible short circuit between the two conductors. The crystal itself is of a plano-convex type with the outer circumferential edges having a substantially flat surface. These surfaces bear against the bends formed in the supporting wires.

Turning now to FIGS. 3 and 4, there is illustrated a method in which the crystals are prepared for use in the supporting structure generally shown in FIGS. 1 and 2. FIG. 3 shows a rounded flat blank with two small notches in the periphery of the crystal which mark the ZZ' axis. This axis is found by placing the crystal under a stauroscope. This method of locating the ZZ' axis is accurate within ±2 degrees of the actual ZZ' axis. The notches may be made with a diamond saw and are much smaller than the exaggerated illustration. These notches are cut for reference only during processing and particularly with reference to X-ray orientation measurements.

FIGS. 5, 6 and 7 show the crystal with a fired-on gold electrode 43 with the extensions 45 and 47 reaching to the perimeter of the crystal on opposite sides thereof. The electrode size depends upon the particular specifications and the material used to form the electrode does not necessarily have to be gold but may be any material depending upon how the crystal is to be used. The coatings 35 and 37 extend partially around the periphery on the flat edge of the crystal over a predetermined arcuate angle from the extensions 45 and 47 of the electrode 43. These connections may be fired-on silver-glass paste which fill the notches as illustrated in FIG. 5 and then extend in opposite directions around the outer periphery of the crystal. They may be extended as far as desired as long as there is no possibility of short circuiting across the two electrodes. It is preferable to extend each of these fired-on silver paste coatings approximately 100° in each direction from the extensions 45 and 47. It is to be understood that the electrodes and connections have been exaggerated as to width for purposes of illustration.

FIG. 7 shows the base and the connectors 13 and 15 with the supporting spring arms mounted on the base and extending upwardly therefrom. The phantom lines illustrate the position of the arms with the crystal in place. It will be noted that the central section 18 of the spring arms is bent at an angle from the first bend 21 up to the outer extremity terminating in the bend 23. The reason for this configuration is that the spring arms must be spread apart in order to place the crystal therein. Since these supporting arms are made of a very stiff spring material, the resultant compression effect holds the crystal securely after it has been placed therein. Therefore, there is no need whatsoever to solder the crystal to the supporting structure.

FIG. 8 shows in detail the manner in which the bends 23 in the spring arms support and grasp the crystal. The bend 23 contacts the crystal at the corners formed by the two faces of the crystal and the substantially flat circumferential edge of the crystal at a point where the silver-glass fired-on paste provides the electrical connections between the electrodes and the arms. At each bend, the coating 37 is contacted at two infinitesimally small points 31 and 33 so that the crystal is held in position by an eight contact mount.

One of the primary features of this mount is that the crystal does not necessarily need to be held at its nodal points, nor does it need to be held at the Z axis notches as illustrated in the drawings. The extension of the silver-glass paste for approximately 100° around the peripheral edge of the crystal affords a contact between each electrode and their respective post regardless of the manner in which the crystal is placed in the crystal holder. Therefore, the crystal is supported at points where it should be the most active according to theory for this type of crystal. Yet, the performance of this crystal structure mounting has proven to be far superior to any of the presently known types of crystal mounts.

In using the eight point mount of the present invention, a plano-convex crystal without a bevelled edge and with a 12.5 micron finish on the surfaces is all that is necessary to acquire a low resistance and a high Q factor. If aging should be a most important parameter, the crystals can be polished. This is in particular contrast to the conventionally mounted crystal wherein soldering or pasting the lead wire to the crystal electrodes is required. In this prior type of structure it is also necessary to use a bi-convex crystal, or a plano-convex with bevelled edge crystal in order to achieve a low resistance and a high Q. A major disadvantage with bi-convex crystals, besides loss of Q, is that additional contouring is required. When a crystal plate is contoured on both sides, control of the desired temperature coefficient is decreased considerably.

It should also be noted that the holders may be made in many different sizes depending on the size and the frequency of the quartz crystal. Various materials could be used for the arms such as music wire, stainless steels, oil tempered chrome, silicate spring wire and many other types of wires. Different types of material used in making the holders have different resonating frequencies and, therefore, may be chosen for corresponding crystal frequencies. This is also true of the particular diameter of the wires used, with different diameters having different resonating frequencies which again may be selected with respect to particular corresponding crystal frequencies.

It will be obvious that the use of the mount of the present disclosure provides assembly techniques superior to that of any known soldered type of connection. In order to assemble the device, one may simply slide the crystal into the mount as shown in FIG. 8. There is no need for paste or solder between the crystal and the support or between the crystal and the electrical connection which is, in effect, the support. The compression of the holder springs against the crystal provides a secure support.

As an example, the support structure of the present invention gave an average resistance for a 1 mc. crystal of 10 ohms when mounted in an HC 6 can as compared to a 300 ohm resistance for a 1 mc. crystal mounted in a nylon-nest structure within an HC 6 can and 20 ohms for the extremely high precision 1 mc. crystal mounted in a glass bulb.

The average Q of a 1 mc. crystal mounted in the holder of the present invention was 2,100,000 as compared to the 1 mc. crystal mounted in the normal fashion in the HC 6 can having a Q of 70,000 and a Q of 600,000 for the high precision 1 mc. crystal mounted in the glass bulb.

The present type of crystal holder has been subjected to vibration tests with the following results. A group of 1 mc. crystals mounted in these holders were vibrated in three different planes with the intention of destroying them. However, after 8 hours at 10 g's, 8 hours at 20 g's, 8 hours at 30 g's and finally 2 hours at 40 g's, the tests were stopped as it was felt that a more strenuous test than this was unnecessary. During this test the activity or effectiveness of the crystals remained at a very constant level.

The aging of the one mc. crystals mounted in the holder of the present invention and sealed in an HC 6 metal can has been shown to be $1 \times 10^{-8}$ per day or less and as little as $1 \times 10^{-10}$ per day when sealed in a glass bulb.

The present invention provides an extremely ruggedized low frequency crystal mounting structure for units in the frequency range of 500 kc. to 1500 kc. Even the most rugged mounts now known and in use on the market experience difficulties with active crystals below approximately 1200 kc. due to the dampening of the particular mounting devices and the solder or paste required in finishing the structure.

It should be noted that some of the particular details illustrated in the present drawings and discussed in the specification could be varied and without departing from the scope of the present invention. Accordingly, this invention is to be limited only by the scope of the following claims.

I claim:
1. A piezoelectric crystal mount comprising
   a base,
   a pair of rigid electrical conductors extending through said base,
   a resilient wire extending upwardly from each of said conductors, each of said wires terminating at their upper end in a substantially right angle bend and having a further similar bend intermediate said terminating bend and said conductors,
   a generally flat symmetrical crystal mounted between and supported by said resilient wires at said bends,
   electrodes on opposite faces of said crystal, each of said electrodes extending to opposite edges of said crystal and partially about the circumference of said crystal so as to contact the associated angle bends in said resilient wires,
   and a housing secured to said base for enclosing said crystal.
2. The apparatus of claim 1 wherein said crystal has a flat circumferential edge with the corners formed by said edge and the faces of said crystal and associated electrode being in contact with said bends in said resilient wire.
3. The apparatus of claim 1 wherein the lower ends of said resilient wires are coiled so as to fit about said rigid electrical conductors.
4. The apparatus of claim 2 wherein the electrodes extend about the circumferential edge of said crystal through an arc of less than 180°.
5. In a piezoelectric mounting structure,
   a base,
   a pair of rigid electrical conductors extending through said base,
   a resilient wire coupled to and extending upwardly from each of said conductors, each of said wires terminating in an angular bend at the outer extremity thereof, a second angular bend in each of said wires between said outer extremity and said conductors, said second angular bend lying in a plane substantially perpendicular to the axis of said wire, a substantially flat symmetrical crystal mounted between said wires, said crystal being in contact with and supported by said angular bends, and electrodes plated on opposite faces of said crystal, said electrodes extending to opposite edges of said crystal and circumferentially thereabout so as to contact opposite wires at one of said bends.

6. The apparatus of claim 5 wherein said crystal has a substantially flat circumferential edge.

7. The piezoelectric mounting structure of claim 5 further comprising opposed notches in the periphery of said crystal located substantially on the ZZ' axis thereof with said electrodes extending to and filling said notches.

References Cited by the Examiner
UNITED STATES PATENTS

| | | | |
|---|---|---|---|
| 2,676,275 | 4/54 | Bigler | 310—9.4 |
| 2,784,326 | 3/57 | Purdue | 310—9.4 |
| 2,824,981 | 2/58 | Warden | 310—9.4 |
| 2,850,651 | 9/58 | Hoffman | 310—9.4 |
| 2,937,293 | 5/60 | Awender et al. | 310—9.4 |
| 3,022,431 | 2/62 | McKnight | 310—9.4 |

MILTON O. HIRSHFIELD, *Primary Examiner.*